E. BOETTGER.
FOWL BEHEADING TOOL.
APPLICATION FILED DEC. 21, 1911.
1,085,793.
Patented Feb. 3, 1914.
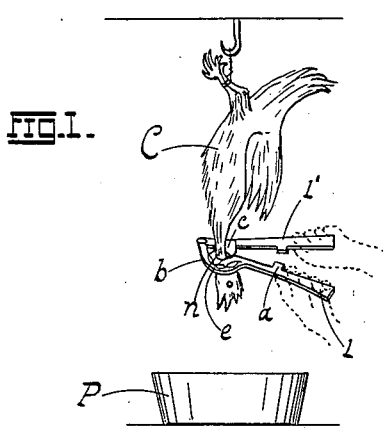
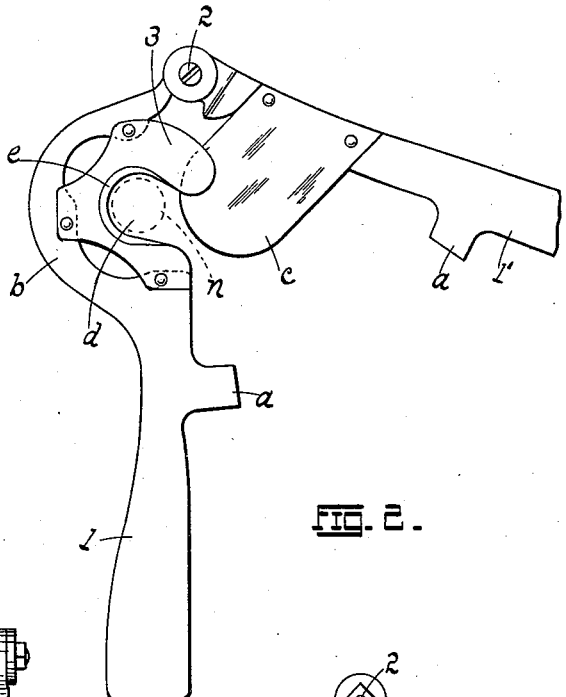
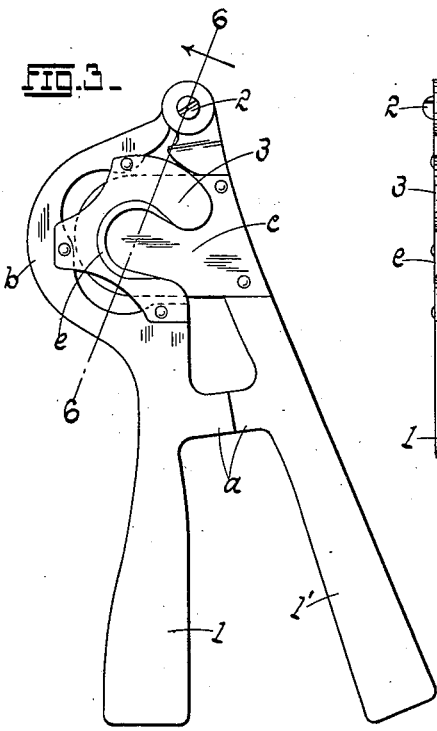
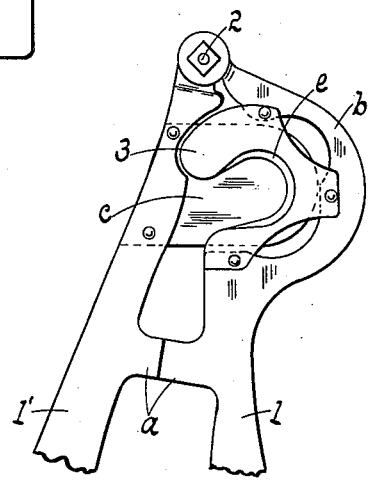
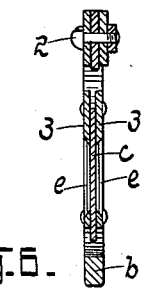
WITNESSES:
Harry A. Beimer
Fannie E. Weber
INVENTOR.
Ernst Boettger.
BY
ATTORNEY.

UNITED STATES PATENT OFFICE.

ERNST BOETTGER, OF ST. LOUIS, MISSOURI.

FOWL-BEHEADING TOOL.

1,085,793.  Specification of Letters Patent.  Patented Feb. 3, 1914.

Application filed December 21, 1911. Serial No. 667,137.

*To all whom it may concern:*

Be it known that I, ERNST BOETTGER, citizen of the United States, residing at St. Louis, State of Missouri, have invented certain new and useful Improvements in Fowl-Beheading Tools, of which the following is a full, clear, and exact description, reference being had to the accompanying drawings, forming a part hereof.

My invention has relation to improvements in fowl beheading tools; and it consists in the novel details of construction more fully set forth in the specification and pointed out in the claim.

In the drawings, Figure 1 is a perspective showing the application of my invention; Fig. 2 is a plan of one face of the tool showing the same open; Fig. 3 is a similar view with the parts in closed position; Fig. 4 is an edge view, broken in the middle; Fig. 5 is a view of the tool in closed position taken from the reverse side to that shown in Fig. 3; and Fig. 6 is a section on the inclined line 6—6 of Fig. 3.

The object of my invention is to provide a tool especially adapted for beheading chickens, thus dispensing with the usual custom of placing the fowl's head on a block and chopping the head off with an ax or hatchet. With my improvement the decapitation is clean, the severed head simply dropping into a suitable pan in which the blood dripping from the body may likewise be caught. The operation may thus be performed in a humane manner and scattering of blood be avoided.

The advantages of the invention will be fully apparent from a detailed description thereof which is as follows:—

Referring to the drawings, 1, 1', represent two lever handles or members hinged together at their ends about the stud 2 and adapted to be seized by the hands and operated on the order of a pair of shears or pliers. The inward movement of the levers is limited by the lugs $a$, $a$, as shown. The member 1 is formed into an outwardly bowed portion $b$ which thus forms a sort of pocket for the accommodation of a lobe or equivalent formation $c$ riveted to the lever 1', said lobe being received in the space between the blades 3, 3, riveted to the opposite faces of the bowed portion $b$ of the member 1. As shown in the drawings, the blades or rather the knife edges thereof are curved so as to form a recess or pocket $d$ for the initial accommodation of the neck $n$ of the chicken C (or other fowl) as clearly illustrated in Fig. 2 where the members 1, 1', have been opened out for the reception of the neck, and as likewise illustrated in Fig. 1 which shows the neck of the bird being severed.

By opening the members 1, 1', and allowing the neck of the fowl to be received in the pocket or depression $d$ of the blades, and then subsequently closing the members 1, 1', the lobe $c$ will pass between the blades 3, 3, thus imposing on the cutting edges thereof a shearing action (the knife edges of the blades coöperating with the sides of the lobe $c$) and readily severing the head of the fowl from the body. The head drops into a pan P into which the blood may be allowed to drip, and the operation is clean and rapid. The cutting edges $e$ of the pair of blades being disposed about the recess or pocket $d$ serve to practically embrace the neck of the fowl so that the same can not slip away from its position during the inward movement of the lobe $c$.

The blades may be readily sharpened by any form of blade sharpener without the necessity of removal from the members 1, 1'.

It will be seen that the blades 3 are secured to the bowed formation of the lever 1 at fixed points along the formation, the blades being spaced from the inner edge of the formation between said points. This leaves open spaces for the escape of feathers and the like, as clearly obvious from the drawing (Figs. 2, 3).

Having described my invention, what I claim is:—

A fowl-beheading tool comprising a pair of terminally hinged handle levers, one of said levers being provided with an outwardly bowed formation adjacent the hinge axis of the levers, a pair of blades secured opposite one another to said bowed formation at fixed points along the formation and spaced from the inner edge of said formation between said points, the blades being spaced apart and the cutting edges thereof being curved to form a recess or pocket for the reception of the neck of the fowl, a lobe on the opposite lever adapted to be received in the open space between the blades and to enter the pocket aforesaid with a closing movement of the levers, said lobe imposing on the blades a shearing action, and means for limiting the levers in their closing movement.

In testimony whereof I affix my signature, in presence of two witnesses.

ERNST BOETTGER.

Witnesses:
EMIL STAREK,
FANNIE E. WEBER.

Copies of this patent may be obtained for five cents each, by addressing the "Commissioner of Patents, Washington, D. C."